United States Patent
Daumas et al.

(10) Patent No.: US 6,709,022 B1
(45) Date of Patent: Mar. 23, 2004

(54) DEVICE FOR CONNECTING A BRANCH PIPE ON A FLUID-TRANSPORTING PIPING SYSTEM

(75) Inventors: Didier Daumas, Chateauneuf Vilevieille (FR); Lionel Daumas, Nice (FR); Jean-Philippe Kervern, Nice (FR); Marc Lapeyre, La Trinite (FR)

(73) Assignee: Innovation Gernerale, Monaco (MC)

( * ) Notice: Subject to any disclaimer, the term of this patent is extended or adjusted under 35 U.S.C. 154(b) by 0 days.

(21) Appl. No.: 09/646,322

(22) PCT Filed: Jan. 14, 2000

(86) PCT No.: PCT/FR00/00078

§ 371 (c)(1),
(2), (4) Date: Sep. 15, 2000

(87) PCT Pub. No.: WO00/42342

PCT Pub. Date: Jul. 20, 2000

(30) Foreign Application Priority Data

Jan. 18, 1999 (FR) .............................. 99 01077

(51) Int. Cl.[7] .................................................. F16L 41/00
(52) U.S. Cl. ...................... 285/197; 264/268; 264/275; 137/318
(58) Field of Search ............................... 285/197, 198; 264/268, 275; 137/317, 318

(56) References Cited

U.S. PATENT DOCUMENTS

| | | | | |
|---|---|---|---|---|
| 4,059,291 A | * | 11/1977 | Acda et al. ................ | 285/197 |
| 4,284,459 A | * | 8/1981 | Patel et al. ................. | 264/275 |
| 4,455,482 A | | 6/1984 | Grandclement | |
| 4,551,292 A | * | 11/1985 | Fletcher et al. ............. | 264/275 |
| 4,684,417 A | | 8/1987 | Grandclement ............... | 156/64 |
| 5,975,117 A | * | 11/1999 | Schweitzer et al. ......... | 285/197 |
| 6,012,475 A | * | 1/2000 | Taylor et al. ................ | 285/197 |
| 6,274,073 B1 | * | 8/2001 | Schafstein ................... | 264/275 |

FOREIGN PATENT DOCUMENTS

| | | | | |
|---|---|---|---|---|
| DE | 195 12 591 | 10/1996 | .......... | B23B/41/08 |
| DE | 196 30 029 | 1/1998 | .......... | B23B/41/08 |
| DE | 197 05 265 | 8/1998 | .......... | B23B/41/08 |
| EP | 726 419 B1 | 2/1996 | .......... | F16L/41/04 |
| EP | 0 736 718 A1 | 10/1996 | .......... | F16L/47/00 |
| EP | 0 821 193 A1 | 1/1998 | .......... | F16L/47/00 |
| FR | 2 519 578 | 4/1982 | .......... | B29C/17/10 |
| FR | 2 757 442 | 6/1998 | .......... | B29C/45/14 |

* cited by examiner

*Primary Examiner*—David Bochna
(74) *Attorney, Agent, or Firm*—Cohen, Pontani, Lieberman & Pavane

(57) ABSTRACT

A device for connecting a branch pipe (54) on a fluid-transporting piping system (C). The device (B) includes a support portion (12) on a wall of the piping system (C); a piece (28) for connecting the pipe (54); a perforating member (20) provided with a cutter (70) for perforating the wall (10) of the pipe and a cylindrical portion (71) mounted atop the cutter whereof the outer face (60) is smooth. The device further includes a shaft (16) cylindrical in shape along an axis (51) which receives the perforating member (20) and wherein the perforator can be displaced by screwing to pass from a position perforating the wall (10) to a retracted position inside the shaft (16). A seal (E, 30) is disposed between the shaft (16) and the perforating member (20). The support portion (12), the connecting piece (28), the shaft (16) and the seal (E) are made integral by moulding or overmoulding, and the seal is supported on the outer face of the perforating member (20).

13 Claims, 5 Drawing Sheets

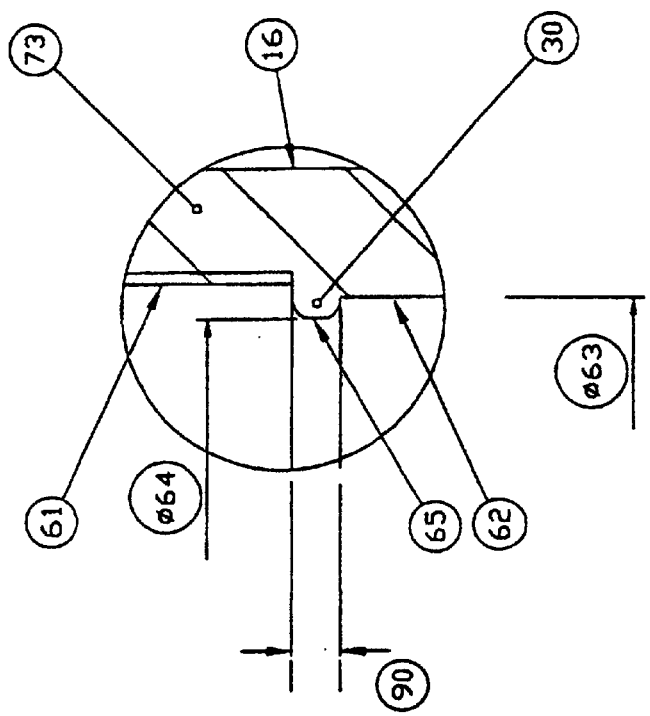
- FIG. 5 -
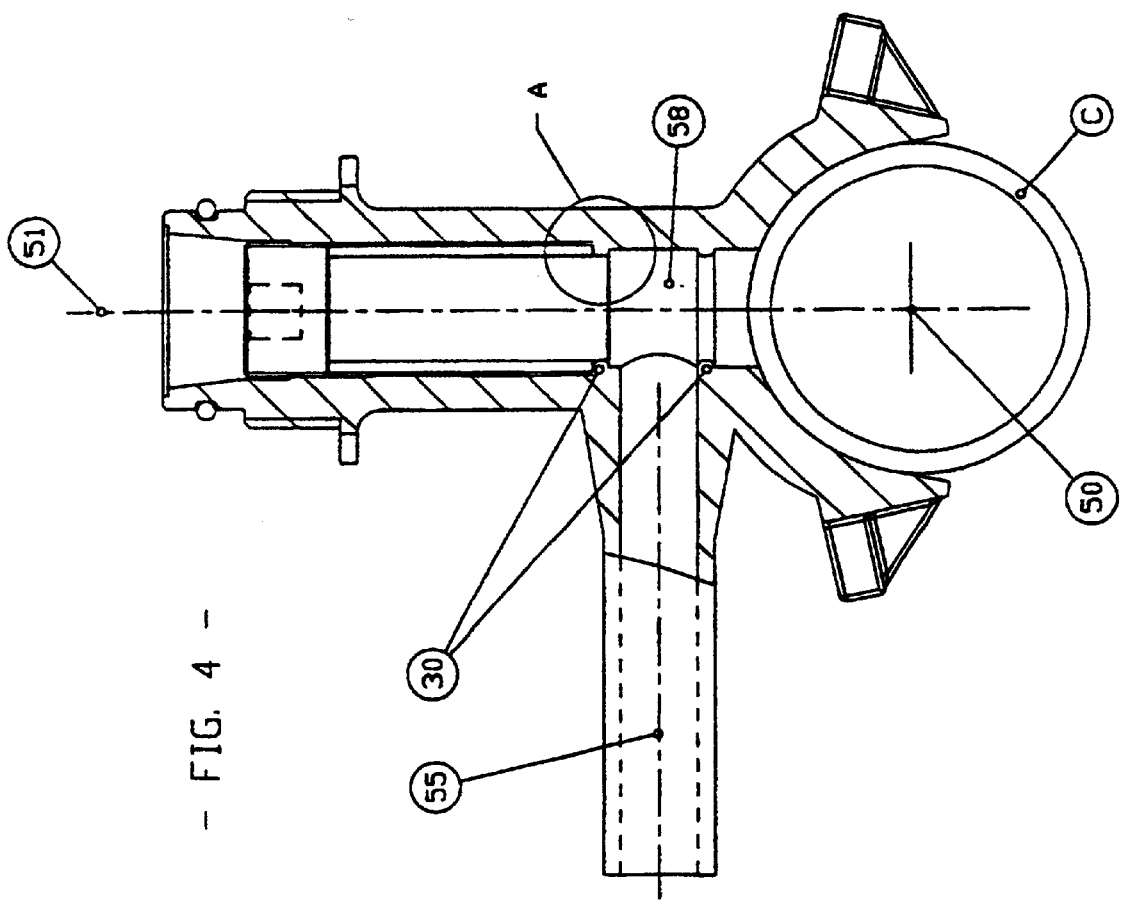
- FIG. 4 -

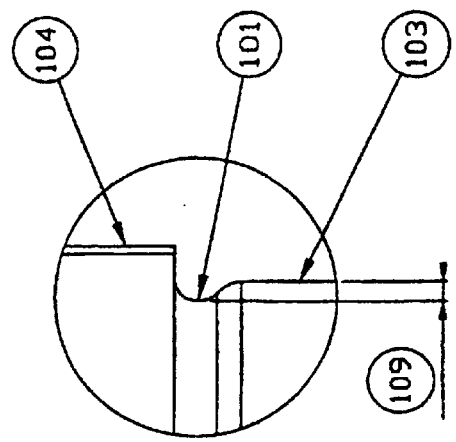
– FIG. 7 –
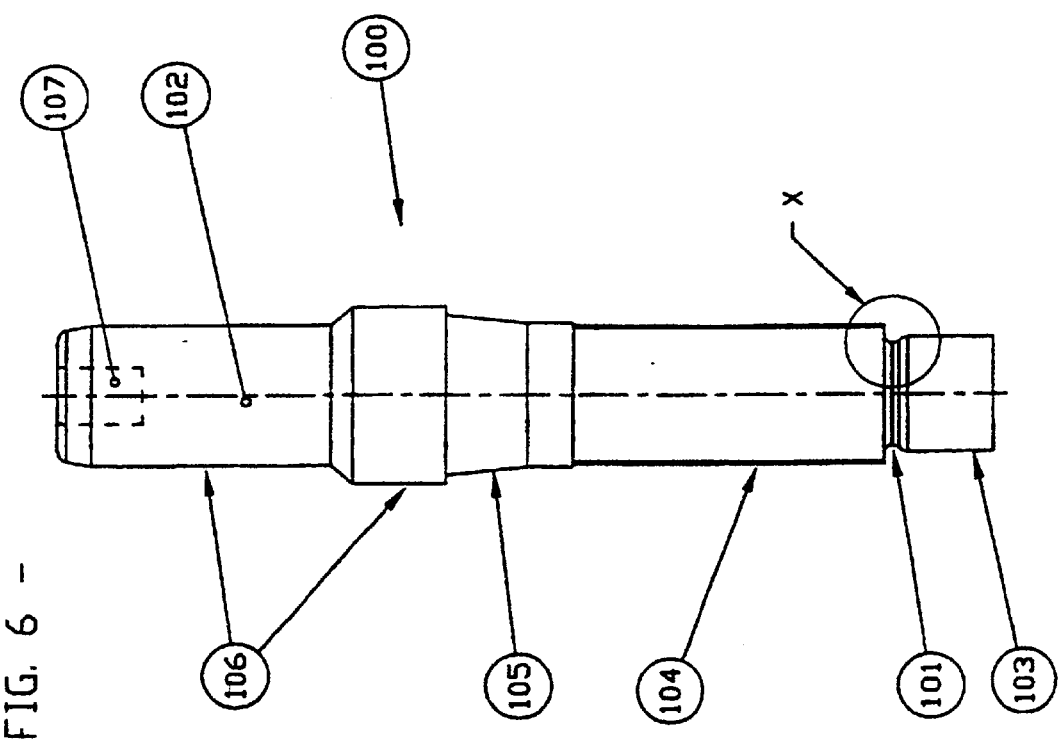
– FIG. 6 –

US 6,709,022 B1

DEVICE FOR CONNECTING A BRANCH PIPE ON A FLUID-TRANSPORTING PIPING SYSTEM

PRIORITY CLAIM

The is a U.S. national stage of application No. PCT/FR00/00078, filed on Jan. 14, 2000. Priority is claimed on that application and on the following application: Country: France, Application Ser. No. 99/01077 filed on Jan. 18, 1999.

BACKGROUND OF THE INVENTION

1. Field of the Invention

The present invention concerns a device for connecting at least one branch pipe on a fluid-transporting piping system: the fluid transported may be under pressure, in a liquid state or gaseous.

2. Description of Related Art

The invention concerns more particularly said device for connecting a pipe known as a secondary pipe to a main pipe which comprises a first portion forming a sole able to cover one portion of the rear face of the wall of the main pipe on which it rests and/or is nested.

A resistive element (electrically conductive) can be integrated in this sole and is intended to be connected to a current source so as, via heating of the sole and the main pipe, to provoke welding of the device to this pipe: these connection devices known as electro-weldable devices, are particularly adapted to cases where the main pipe transports a fluid under pressure; if on the other hand the fluid is transported without any pressure (or under low pressure), the connection device can be rendered integral with this pipe by means of a mechanical link, such as a strap.

These devices further comprise a tubular sleeve forming a connection piece for the connection of a secondary pipe, as well as a cylindrical shaft (or second sleeve) in which a perforating member is mounted mobile coaxially to the shaft; the perforating member comprises a lower tubular wall whose free extremity forms a cutter for cutting the wall of the main pipe and whose upper portion is externally threaded so as to co-operate with an internal threaded portion of the shaft. These devices are described in the documents U.S. Pat. No. 4.684.417, FR 2 519 578, EP 736 718 and EP 821 193.

The invention is particularly applicable to said devices whose sole, shaft and sleeve form a single moulded plastic piece.

Other connection devices, complex as regards their structure and implementation, are described for example in the document EP-A-0 726 419.

The object of the present invention is to have a connection device of this type being of simple design produced at a reduced cost and being easy to use, even by unqualified workers and which allows a branch pipe be connected to a fluid-transporting pipe system when the fluid transported is under pressure, that is without interrupting the supply of fluid by this pipe (the main pipe).

BRIEF SUMMARY OF THE INVENTION

Thus, the present invention concerns a device (known) for connecting a branch pipe on a fluid transport pipe system known as a main pipe, said fluid transport pipe system comprising a wall separating the fluid from the outer environment, said connection device comprising a support portion (sole) having a shape complementary to that of the outer surface of the wall of the fluid transport pipe and provided with means to render integral the support portion with this outer surface; a device for perforating the wall of the main pipe comprises a perforating member able to be moved inside a cylindrical shaft integral with the support portion so as to make an opening in the wall of the main pipe, as well as a, connection piece for connecting the branch pipe to a main pipe and able to be placed in communication with the latter after said opening has been made and the perforating member has been freed from said opening.

According to one characteristic of the invention, the connection device comprises a sealing device prohibiting (or limiting) the passage of said fluid between the shaft and the perforating member, one portion of the latter being formed by the internal surface of the shaft and which is in sealing contact with a smooth lower portion of the outer surface of the perforating member.

The sealing device preferably includes a toric flange projecting to the internal surface of the shaft which ensures sealing contact with said smooth portion of said perforating member. This flange, which causes a retraction of the internal cross section of the shaft, is preferably formed of a single piece with the shaft when the latter is moulded.

According to one embodiment variant, the retraction of the internal section of the shaft is obtained by a ring with a circular section (toric joint, possibly movable) in a toric throat provided on the internal surface of the wall of the shaft.

This ring can be moulded on the internal surface of the cylindrical shaft and/or be rendered integral with the shaft by means of welding: it can strictly be constituted by an added toric joint (housed) in the throat of the shaft after the latter has been moulded. However, as the moulding of this throat requires the use of an expansible tool (core), the embodiment is difficult to realise.

According to another aspect and in other terms, the invention consists of offering this connection device in which the support portion (sole), the connection end piece, the shaft receiving the perforator and sealing means between the shaft and the perforator are rendered integral by means of moulding or cast moulded; in addition, the sealing means are shaped in such a way so as to enclose the smooth face of the perforator after introducing the latter into the shaft. To this effect, the passage diameter of the sealing means in its free state is smaller than the diameter of said external smooth face of the perforating member. Preferably, the difference of said diameters is between a range of between 0.3 and 0.9 mm and in particular between 0.4 and 0.8 mm.

The sealing means are preferably constituted by one or two annular flanges in the shape of a torus with an axis approximately merged with the longitudinal axis of the shaft and having an approximately semi-circular section. The annular flange is preferably made of the same material as the material constituting the walls of the shaft obtained by means of moulding in a single operation and the profile of the section of the torus is flattened in its central portion.

To this effect and according to another characteristic, the invention consists of providing an injection mould of a plastic outline of the connection device which comprises a core forming a movable portion of the mould which receives or is used to shape the sealing means. So as to shape during moulding a toric sealing flange projecting to the internal surface of the shaft, the movable core preferably comprises an annular throat with the shape of a torus coaxial with the longitudinal axis of the core having approximately the general shape of a cylinder. This throat extends between one extremity portion of the core used for moulding a connection chamber of the shaft and connection piece, and a central portion of the core used for moulding the shaft.

Alternatively, the core may comprise a cylindrical bearing for example equipped with stops for supporting the toric joint. In this case, this joint is rendered integral with the outline by means of cast-moulding during moulding of the latter. This nevertheless has the drawback of requiring an additional handling since it is necessary to have a joint on the core for each part to be produced and then ensuring after removal from the mould that its position is correct.

In both cases, the central portion of the core for moulding the shaft is preferably threaded externally so as, during moulding, to shape the internal threading of the shaft. In this case, the extraction of the core outside the moulded outline is effected by unscrewing the core with respect to the shaft.

During extraction of the core, the shaped sealing means or integrated with the outline are subjected to deformation: a mainly elastic deformation when the sealing element is a cast-moulded joint or basically plastic when this element is constituted by the flange obtained by moulding and in this latter case, this generally results in a flattening of the central portion of the flange.

The invention is able to provide sufficient sealing in practice between the shaft and the perforator. The invention is able to also avoid any delicate visual inspection of the presence of the joint in the moulded part and generally avoids the presence of additional joints mounted on the perforator.

The invention is able to provide a highly resistant mechanical link between the sealing element and the shaft and makes it possible to obtain this element, the risks of wear and/or deterioration of said element during movement of the perforator being extremely low.

The invention is able to reduce the number of parts to be produced, stored, rendered integral sealed and controlled.

The invention facilitates the automated production of the connection device and reduces the number of handlings of small ductile parts, namely the joints.

Other aims, characteristics and advantages of the invention shall appear clearly from a reading of the following description with reference to the accompanying drawings illustrating non-restrictive embodiment examples.

BRIEF DESCRIPTION OF THE SEVERAL VIEWS OF THE DRAWINGS

FIG. 4 is a cutaway view, seen via a median transversal plane containing the respective axes 51, 55 of the shaft and connection piece, of the device shown on FIG. 2.

FIG. 5 is an enlarged view of the details A of FIG. 4.

FIG. 6 is a side view of the movable core of a mould for the production of a device conforming to the invention.

FIG. 7 is an enlarged view of the details X of FIG. 6.

DETAILED DESCRIPTION OF THE INVENTION

Figure 1:
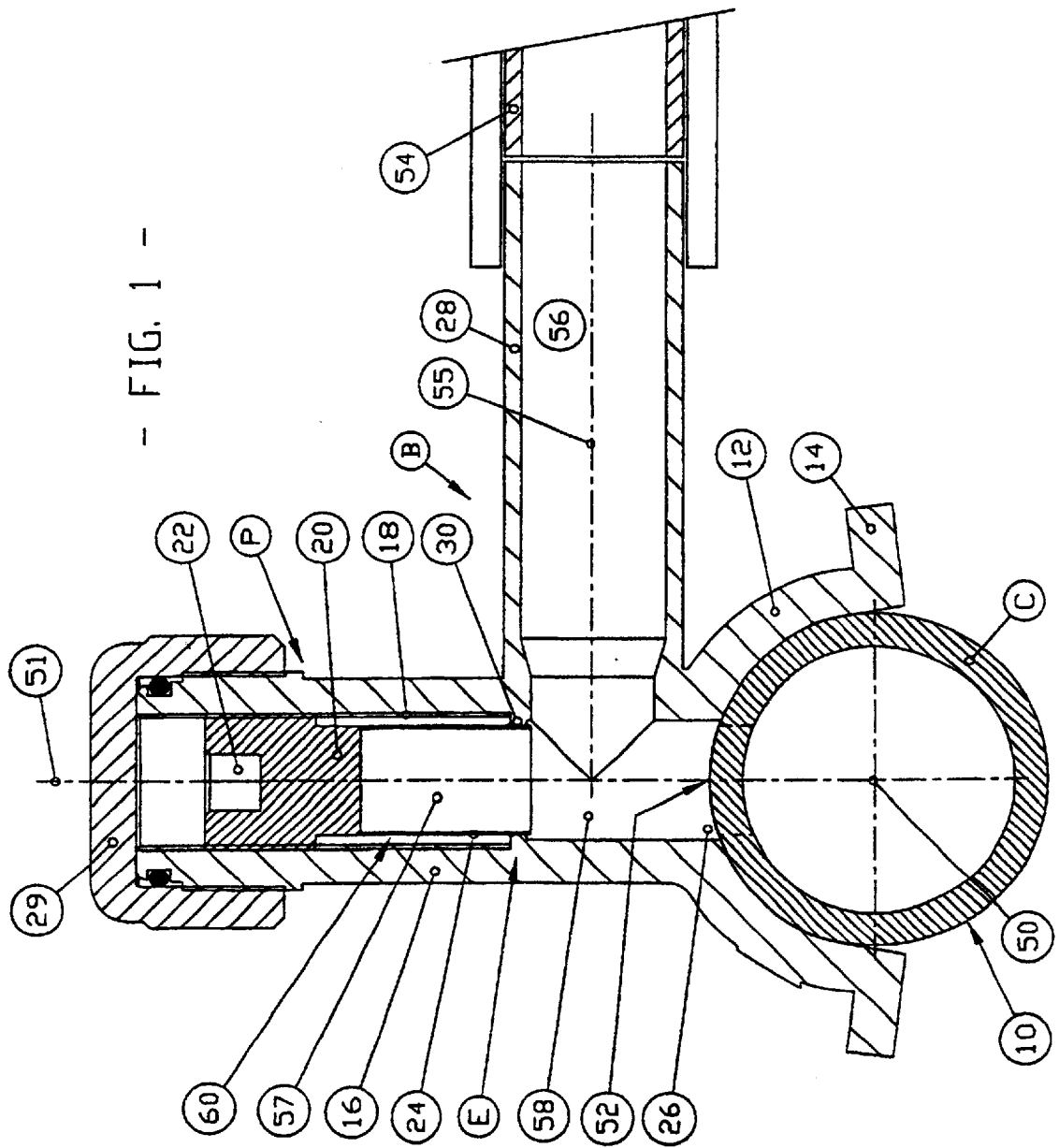
FIG. 1 is a cross sectional view of a connection device according to the invention.
Figure 2:
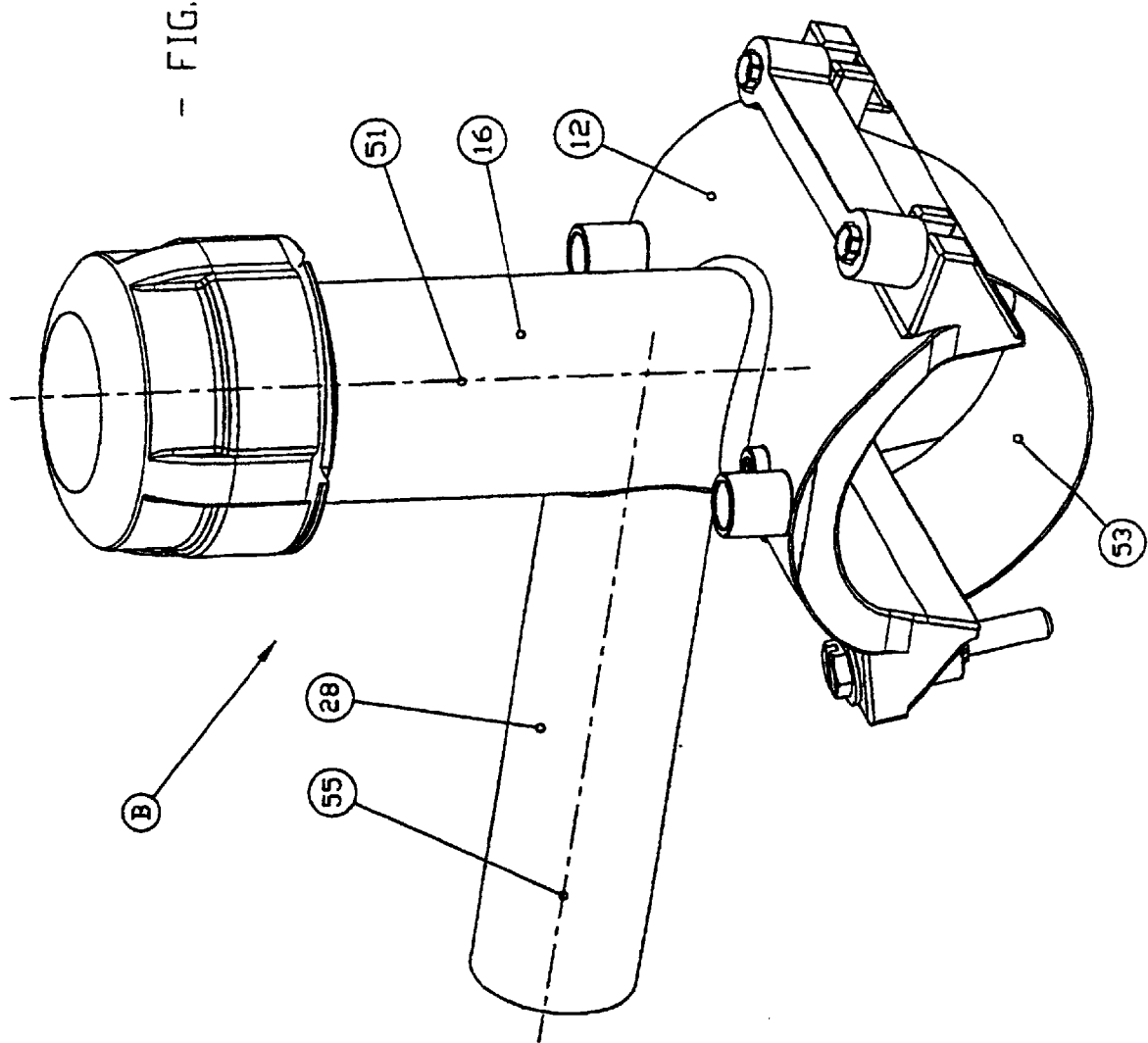
FIG. 2 shows a diagrammatic perspective view of a connection device according to the invention.
Figure 3:
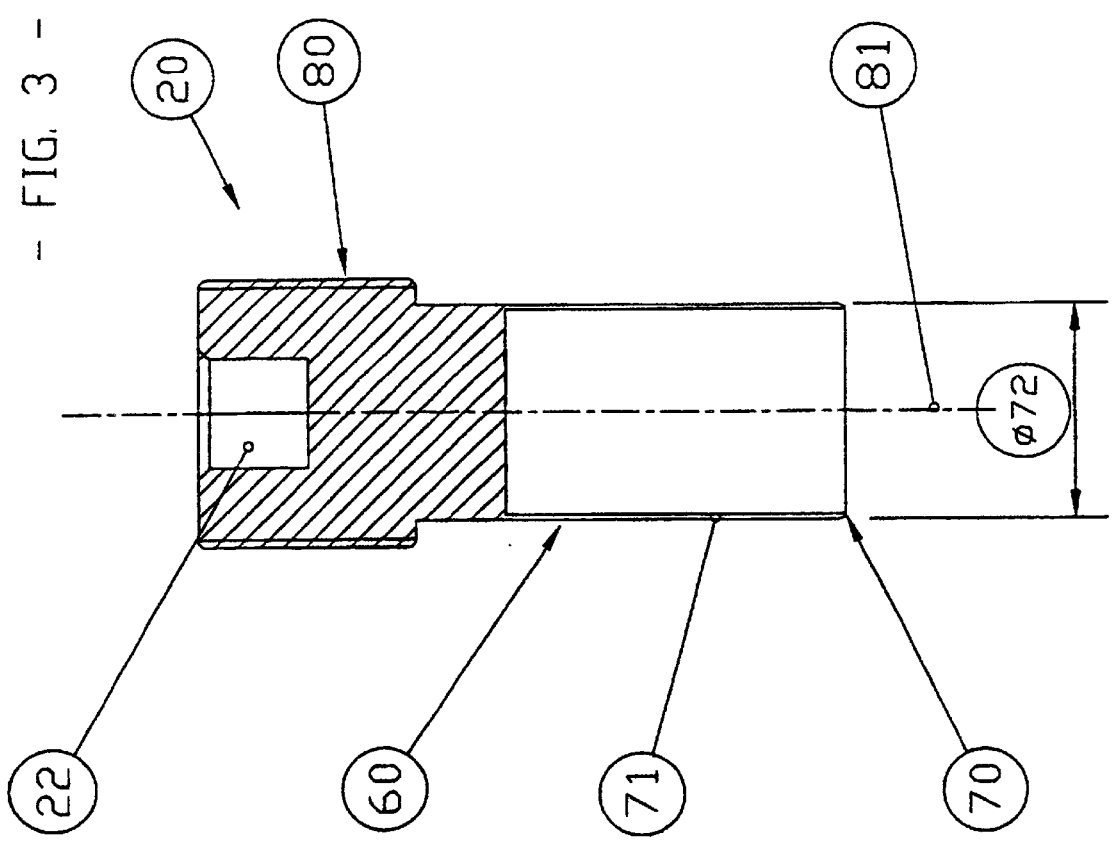
FIG. 3 is a longitudinal cutaway view of the perforator equipping the device of FIGS. 1 and 4.

The main pipe C, which comprises a cylindrical wall 10 with an axis 50, is used to transport a combustible gas or water between a station for supplying this fluid or gas and one or several fluid user stations.

The wall 10 is made of a metallic material, such as copper, or non-metallic such as plastic like polyethylene adapted to the nature and pressure of the fluid.

The connection device B comprises a support sole 12 with a shape complementary (generally cylindrical with axis 50) to that of the outer surface of the wall 10.

The sole 12 is provided with means to render the device B integral with the outer surface of the wall 10, said means being constituted by flanges 14 co-operating with a strap 53. The connection device B comprises a device P for perforating the wall 10 which comprises a cylindrical shaft 16 of axis 51 approximately perpendicular to the wall 10 at its top 52. One portion of the length of the cylindrical shaft 16 most distant from the support portion 12 is shaped with an internal screw thread 18, 61 in which it is possible to screw a cylindrical perforator 20 threaded externally at its upper portion 80.

The perforator 20 comprises at its upper extremity directed towards the outside of the shaft 16 a hollow hexagonal indentation 22 so as to be able to be moved with the aid of a hexagonal key (not shown). The perforator 20 comprises at its lower extremity (directed towards the pipe C) a cutting member 24, 70 able to penetrate into an opening 26 provided in the support portion 12 when the perforating element 20 is manoeuvred so as to perforate the wall 10.

The device B comprises a cylindrical connection piece 28 of axis 55 for connecting a branch pipe 54 to the pipe C after the latter has been perforated by the perforator 20. The internal volume 56 of the connection piece 28 is in communication with the internal volume 57 of the cylindrical shaft 16 by means of a chamber 58 fitted in the body of the device B and containing the point of intersection of the axes 51 and 55.

The sole 12, the shaft 16 and the connection piece 28 are made up of a single piece by moulding a material, especially polyethylene, compatible with the transported fluid. The perforator 20 can be made of a metallic alloy.

So as to connect the pipe 54 on the pipe C, first of all the sole 12 is secured to the pipe C by means of flanges 14 (and/or of the integrated electro-welding device), and then the perforator 20 is manoeuvred (by screwing) with the aid of a key co-operating with the indentation 22 so as to make the lower extremity of the perforator 20 descend through the chamber 58 and then the opening 26 in the direction of the pipe C and of making an opening in the wall 10 of this pipe. Then the perforator 20 is manoeuvred in the opposite direction so as to move from the wall 10 and traverse the chamber 58 on going up, thus enabling the fluid to flow from the pipe C to the branch pipe 54 by traversing the chamber 58. A sealed obturation stopper 29 is then placed on the open upper extremity of the shaft 16 by being screwed on a threading formed at the upper extremity of the shaft 16 (most distant from the transport pipe C).

In accordance with the invention, a sealing device E is provided so as to reduce or eliminate a leaking of fluid from the chamber 58 towards the open upper extremity of the shaft 16 by flowing between the perforator and the shaft 16. This sealing device E is placed between the shaft and the perforation member 20.

On FIGS. 1, 4 and 5, the sealing device is constituted by an annular flange (toric shape with axis 51) forming a narrow part 30 of the cylindrical shaft 16 and coming into sealing contact with the smooth cylindrical surface 60 (axis 81) provided at the lower portion of the perforating element 20, said smooth surface being formed at the external periphery of the cutting blade 24, 70. By considering the flow of fluid from the pipe C to the pipe 54 as shown on FIG. 1, the device E is situated downstream of the intake orifice 26 in the chamber 58 between this chamber and the shaft 16. It is possible (as shown on FIG. 4) to provide a narrowing upstream and another narrowing downstream of the chamber 58 so as to allow a sealed separation of the pipes C and 54 by manoeuvring the perforator.

The flange 30 is formed of a single piece with the cylindrical shaft 16 by moulding of the internal surface of the wall of the cylindrical shaft 16. This shaft is made of polyethylene and the smooth portion 71 of the perforator element 20 is made of a metallic material which makes it possible to embody extremely good sealing without using any additional joint.

The joint 30 can also be constituted by a toric joint 30 made of an elastic material such as rubber which is cast-moulded directly in the cylindrical shaft 16 and dimensioned so as to come into seal contact with the smooth portion of the perforating element 20.

The narrow portion 30 can also be obtained by adding a plastic circular ring made of polyethylene, this circular ring receiving an elastic toric joint made for example of rubber, this unit being cast-moulded in the cylindrical shaft 16, the toric joint coming into seal contact with the smooth portion of the perforating element 20.

The core 100 shown on FIGS. 6 and 7 extends along an axis 102. It comprises a first extremity portion 106 fitted with a housing 107 so as to be temporarily fixed in a drawer mould, such as the one described in documents FR 2 519 578 and U.S. Pat. No. 4.684.417 incorporated by reference in this document. The core comprises a central portion 105 for moulding the upper internal extremity 91 of the shaft 16. A cylindrical threaded portion 104 of axis 102 makes it possible to obtain by moulding the threaded face 61 of the shaft. A second extremity portion 103 allows for moulding of the link cavity 58 between the shaft 16 and the connection piece 28.

A toric throat 101 of axis 102 extends between the portions 103 and 104 of the core and is used for moulding the flange 30. By selecting a depth 109 of the throat 101 close to 0.65 mm measured with respect to the external cylindrical face of the extremity 103, a flange is obtained which is partially crushed by this face during extraction from the core outside the shaft. The projecting thickness of the flange after this deformation is such that the difference between the diameter 64 of the deformed central portion 65 and the diameter 63 of the cylindrical face 62 is close to 0.8 mm (namely a thickness of the flange with respect to this face which is close to 0.4 mm).

The diameter 64 is selected smaller than the diameter 72 of the perforator by a value close to 0.6 mm.

So as to embody the two superimposed toric flanges shown on FIG. 4, a second toric throat is provided on the portion 103 of the core; as a variant, it is possible to use the throat 101 so as to carry a toric joint which is rendered integral and/or welded to the wall 73 of the shaft 16 during injection of the plastic moulding material.

By selecting a height 90 of the flange 30 which is equal at least to its projecting thickness, its resistance to tearing by the perforator is increased.

What is claimed is:

1. A device (B) for connecting a branch pipe (54) on a fluid transporting system (C), said device comprising:
    a support portion (12) on a wall (10) of the fluid transporting-system (C); a connection piece (28) for the branch pipe (54);
    a perforating member (20) having a smooth external face(6) and fitted with a cutter (70) for perforating the wall (10), the perforating member (20) having a cylindrical portion (71 ) surmounting the cutter;
    a cylindrical shaft (16) along an axis (51) dimensioned for receiving the perforating member (20) and in which the perforating member is able to move from a perforation position from the wall (10) to a retracted position in the shaft (16);
    sealing means (E, 30) between the shaft (16) and the perforating member (20), the support portion (12), the connection piece (28), the shaft (16) and the sealing means (E) being rendered integral by one of moulding and cast-moulding, the sealing means resting and enclosing said external smooth face of the perforating member (20), and the support portion (12), the connection piece (28), the shaft (16) and the sealing means (E) forming a single moulded part; wherein the shaft (16) comprises an internal threaded portion (61) for screwing the perforator, the shaft thus being without any threaded tubular insert.

2. Device according to claim 1 wherein the passage diameter (64) of the sealing means in its free state is smaller than the diameter (72) of said external smooth face (60) of the perforating member (20).

3. Device according to claim 2 wherein the difference of said diameters (64, 72) is within a range of between 0.4 mm and 0.8 mm.

4. Device according to claim 1 wherein the sealing means (E) comprise a torus-shaped annular flange having its axis approximately merged with the longitudinal axis (51) of the shaft and having an approximately semi-circular section.

5. Device according to claim 4 wherein the annular flange is made of the same material as that constituting the walls (73) of the shaft and obtained by moulding, the profile of the section of the torus of said flange being flattened in its central portion (65).

6. Device according to claim 1 wherein the perforating member (20) has no gasket.

7. Device according to claim 1 wherein the sealing means (E) comprise an annular flange (3) coaxial to the shaft and placed at the lower extremity of the shaft.

8. Device according to claim 1 wherein the perforating member (20) has no gasket.

9. Device according to claim 1 wherein the support portion (12), the connection piece (28), the shaft (16) and the sealing means (E, 30) form a single moulded polyethylene part in a single operation.

10. Device according to claim 1 wherein the support portion (12), the connection piece (28), the shaft (16) and the sealing means (E, 30) form a single moulded polyethylene part in a single operation.

11. A method of making, by means of plastic injection, a device (B) for connecting a branch pipe (54) on a fluid-transporting pipe system (C), said device (B) comprising:
    a support portion or sole (12) on a wall (10) of the fluid transporting pipe system (C);
    a connection piece (28) for the pipe (54);
    a cylindrical shaft (16) along an axis (51) which is intended to receive a perforating member (20) and in which the perforator can be moved by means of screwing;
    sealing means (E, 30) between the shaft (16) and the perforating member (20); said method being implemented with a device (mould) comprising an extended core (100) (mould portion) able to be separated from other portions of the mould and which receives or is used to form said sealing means (E, 30);

wherein the core (100) is extracted from the moulded part by provoking an elastic and/or plastic deformation of the sealing means, the extraction being carried out by unscrewing the externally threaded core from the shaft whose screw thread has been obtained by moulding in contact with a threaded portion (104) of the core.

12. Device Method according to claim 11 in which the core (100) comprises an annular torus-shaped throat (101) coaxial with the longitudinal axis (102) of the core.

13. Method according to claim 11 wherein the core (100) is extracted from the moulded part after the moulded piece and the core (100) have left the mould.

* * * * *